United States Patent [19]
Dane, Jr.

[11] 3,906,922
[45] Sept. 23, 1975

[54] STRATIFIED CHARGE ENGINE

[76] Inventor: Ernest Blaney Dane, Jr., 57 Tyler Rd., Belmont, Mass. 02178

[22] Filed: Sept. 6, 1974

[21] Appl. No.: 503,604

Related U.S. Application Data

[63] Continuation-in-part of Ser. No. 406,560, Oct. 15, 1973, abandoned, and a continuation-in-part of Ser. No. 494,991, Aug. 5, 1974, abandoned.

[52] U.S. Cl. .... 123/190 B; 123/190 R; 123/33 VC; 123/32 ST; 123/32 C
[51] Int. Cl.² .......................................... F01L 7/18
[58] Field of Search .. 123/32 C, 32 D, 32 K, 32 ST, 123/32 JV, 33 D, 33 VC, 80 BB, 80 D, 190 R, 190 D, 190 B, 191 S, 191 SP

[56] References Cited
UNITED STATES PATENTS

| | | | |
|---|---|---|---|
| 2,283,594 | 5/1942 | Aspin | 123/190 D |
| 3,283,751 | 11/1966 | Goossak et al. | 123/32 ST |
| 3,395,680 | 8/1968 | Brooks | 123/78 |
| 3,526,215 | 9/1970 | Aspin | 123/190 D |
| 3,603,299 | 9/1971 | Lamperti | 123/190 D |
| 3,730,161 | 5/1973 | Deane | 123/190 D |

*Primary Examiner*—Charles J. Myhre
*Assistant Examiner*—James D. Liles

[57] ABSTRACT

An engine having a combustion chamber, a member having an elongated passage therein communicating with the combustion chamber and comprising an unrestricted opening thereto, a fuel injector communicating with the other end of the passage for injection of fuel therein, and a partition adjacent said opening partially covering said opening to define with said passage a fuel injection chamber with a restricted open throat during fuel injection, said partition having a limited circumferential extent and said partition and said member being relatively moveable whereby said opening is in unrestricted communication with said combustion chamber during fuel ignition.

In a particular preferred embodiment, the invention features a stationary valve housing, a rotary valve member having within its body the elongated passage and being adapted to carry the passage in a circle on rotation of the valve member, and a stationary partition positioned to partially cover the opening of the passage into the combustion chamber during fuel injection, but also limited in extent so that the passage will be in unrestricted communication with the combustion chamber as the rotary valve proceeds on its circle of rotation during the engine's power stroke.

14 Claims, 9 Drawing Figures

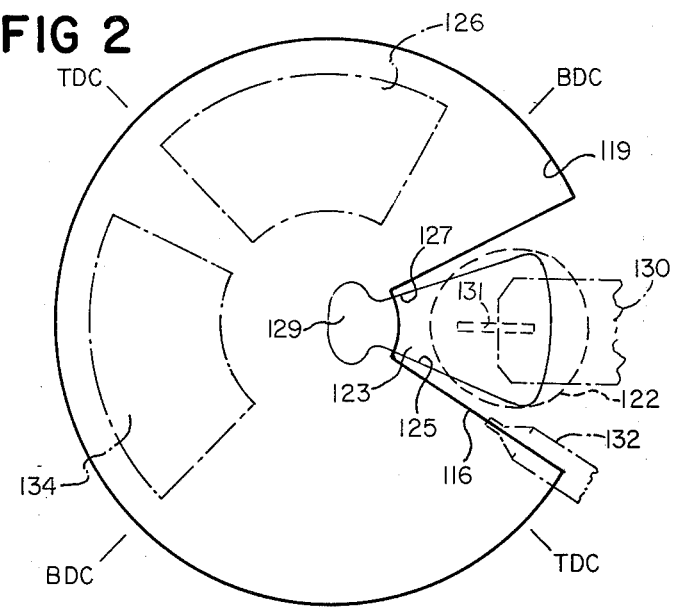
FIG 2
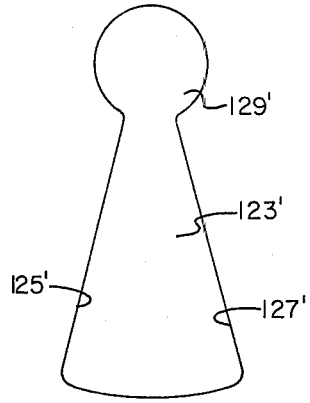
FIG 8
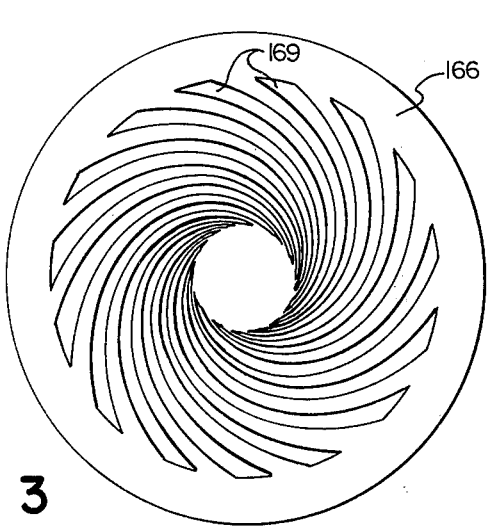
FIG 3
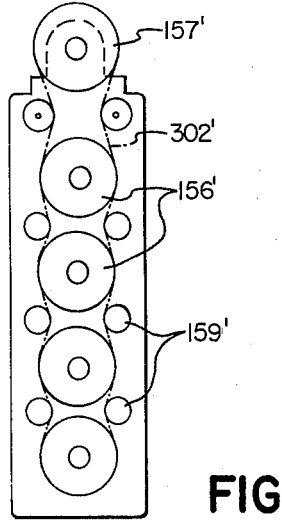
FIG 9
FIG 7

STRATIFIED CHARGE ENGINE

This is a continuation-in-part of my copending applications, Ser. No. 406,560, filed Oct. 15, 1973, entitled Stratified-Charge Clean-Air Engine With Rotary Valve, and Ser. No. 494,991, filed Aug. 5, 1974, entitled Stratified Charge Engine, both now abandoned.

This invention relates to internal combustion engines and more particularly to stratified charge internal combustion engines.

It is a principal object of this invention to provide in an internal combustion engine mechanical means for confining a rich fuel charge adjacent ignition means in the engine and for permitting unrestricted communication of said charge with the main combustion chamber of said engine upon initiation of fuel ignition for controlling the mixture and obtaining substantially complete combustion of the fuel. More particularly, it is an object of this invention to provide a separate fuel injection-ignition chamber communicating with a main combustion chamber of the engine, which separate chamber has a restricted communication with the combustion chamber during fuel injection thereinto and an unrestricted communication with the combustion chamber during fuel ignition. It is another object of this invention to adapt rotary valve engines for stratified charge operation.

In general this invention features an engine having a combustion chamber, a member having an elongated passage therein, one end of the passage communicating with the combustion chamber and comprising an unrestricted opening to the combustion chamber, and a fuel injector adapted for injection of fuel into the other end of the passage. A partition partially blocks said opening and defines with the passage a fuel injection chamber with a restricted open throat communicating with the combustion chamber during fuel injection. The partition and the member having the passage therein are mounted for relative movement, preferably rotation, and the partition has a limited circumferential extent whereby the partition is removed from adjacent the opening after fuel injection to provide unrestricted communication of the passage with the combustion chamber during fuel ignition.

In preferred embodiments, the invention additionally features the partition blocking a major portion of the area of the opening and the opening having a cross-sectional area at the end of the passage adjacent the combustion chamber at least as large as the cross-sectional area of the other end of the passage, the walls of the passage formed to provide an unrestricted passage from one end to the other end thereof.

In a particular preferred embodiment the invention features a stationary valve housing. The member having the passage is a rotary valve member in the valve housing, said member having a valve port at the end of said passage opposite said opening, and said member being adapted to carry said valve port, said opening and said passage in a circle on rotation of said member. Said fuel injector is positioned in said valve housing in a sector of the circle traversed by said valve port for injection of fuel into the passage. Said partition has a circumferential dimension greater than that of the opening and is positioned adjacent the position of the opening when the valve port is in communication with the fuel injector.

In the particular preferred embodiment the invention additionally features the valve housing comprising in sectors of the circle traversed by the valve port and sequentially in the direction of rotation of the valve member, an intake passage, the fuel injector, ignition means, and an exhaust passage, the partition extending circumferentially between the intake passage and the ignition means, preferably commencing after the intake passage and terminating at the ignition means. The combustion chamber comprises a cylinder and the valve member is rotatable about an axis preferably coincident with that of the cylinder, the opening extending generally radially with respect to the axis and the partition being smaller than the opening in a radial direction. The partition is preferably connected to a wall of the cylinder.

Other objects, features and advantages of this invention will be apparent to those skilled in the art from the following detailed description of preferred embodiments thereof taken together with the accompanying drawings in which:

FIG. 2 is a reduced diagrammatic plan view of the head of the cylinder shown in FIG. 1 illustrating the relative positions of the ports and partition therein;

FIG. 3 is a reduced schematic plan view of the thrust bearing employed in the head of the cylinder;

FIG. 7 is a reduced schematic developed view of the interior cylindrical wall of the head of the cylinder illustrated in FIG. 6 showing the relative positions of the ports and partition therein;

FIG. 8 is a developed view along the line 8—8 of FIG. 6 illustrating the configuration of the opening of the rotary valve into the combustion chamber; and FIG. 9 is a reduced schematic plan view of the valve drive arrangement employed with an engine according to the embodiment illustrated in FIG. 6.

Figure 1:
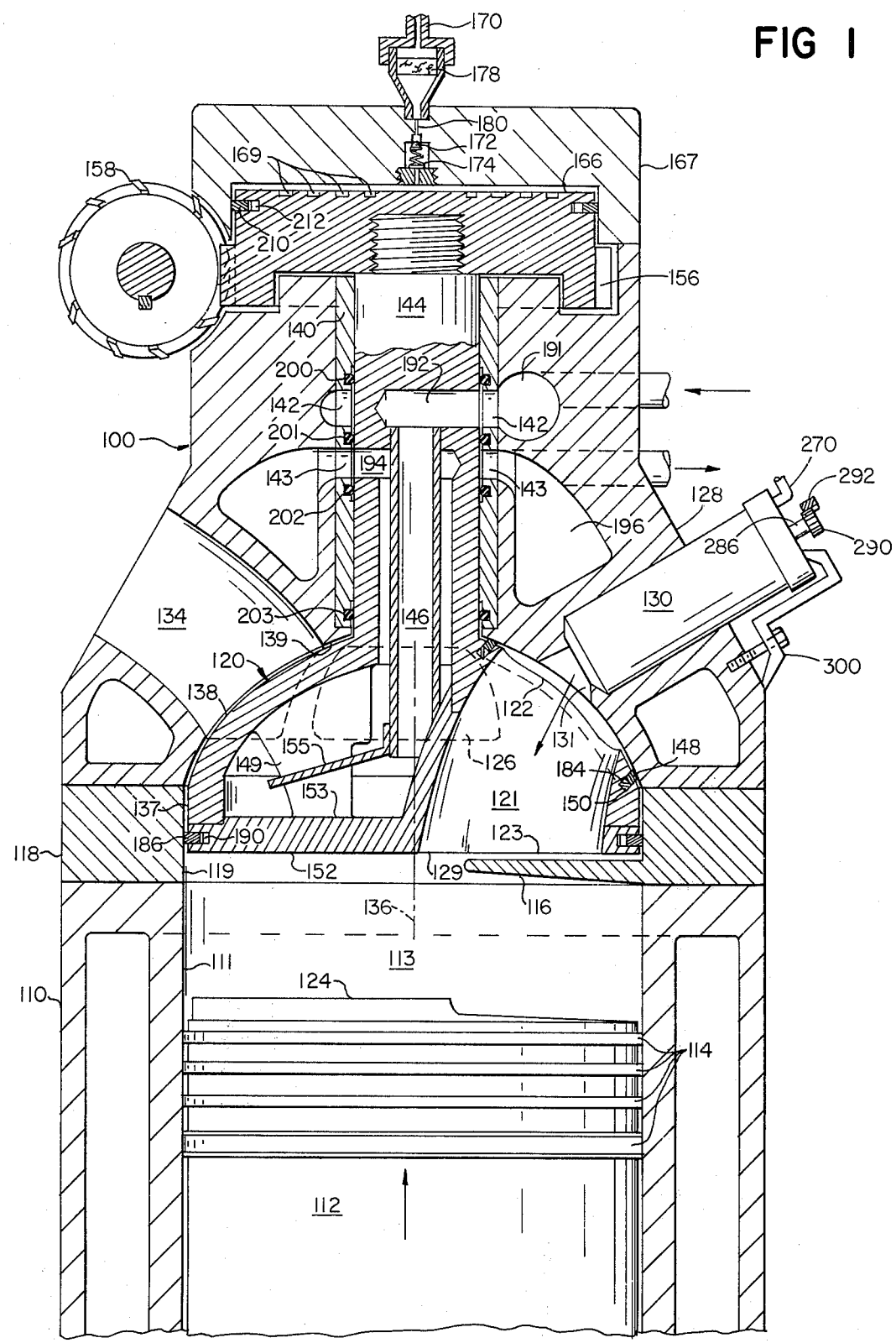
FIG. 1 is a schematic sectional view of one cylinder of an engine embodying the invention.

Referring to the drawings, and more particularly to FIG. 1 thereof, there is shown one cylinder of a four cycle engine constructed according to the invention. The engine in the particular embodiment illustrated is of the rotary valve type.

The engine comprises a head generally designated 100 mounted on an engine block 110. Block 110 comprises a cylinder 111 having a piston 112 reciprocally mounted therein and defining together with the head 100 a main combustion chamber 113. Rings 114 seal the piston 112 to the cylinder wall 111. The crankcase, crankshaft, connecting rods and the like are as for a conventional engine and are not illustrated herein.

Head 100 comprises an adapter 118 mounted directly to block 110, a stationary valve housing 128 mounted on adapter 118 and a cover 167. Adapter 118 has a cylindrical inner wall 119 of the same diameter as cylinder 111 and extends thereabove as a continuation thereof. Valve housing 128 has a spherical or dome shaped cavity defined by wall 139 overlying the cylindrical opening in adapter 118.

Positioned within the dome shaped cavity of valve housing 128 and extending downwardly into adapter 118 is a rotary valve member 120 rotatable about an axis coincident with that 136 of cylinder 111. Rotary valve 120 comprises a body having a spherical or dome shaped upper wall 138, cylindrical peripheral wall 137, valve stem 144 and internal strengthening ribs 149. The upper and peripheral walls 138, 137, respectively, fit within wall 139 of valve housing 128 and within the cylindrical wall 119 of adapter 118. Valve stem 144 extends upwardly through valve housing 128 and is supported therein by plain journal bearing 140. A cooling tube 146 and baffle 155 are positioned within the valve 120. The body of the rotary valve 120 is preferably sand cast, drilled and tapped to accept the cooling tube 146 and baffle 155. The rotary valve 120 also comprises a flat plate 153 extending across the bottom thereof attached to the bottom of peripheral wall 137. The lower surface 152 of the plate 153 opposes the working face 124 of piston 112 and is spaced from the upper wall 138 of valve 120.

An elongated passage 121 extends through rotary valve 120 from the lower surface 152 to the upper wall 138 thereof. Passage 121 is offset from the axis of rotation of valve 120 to be substantially located on one side thereof. As best shown in FIG. 2, valve port 122 at upper wall 138 of valve 120 is generally circular and is offset from the axis of rotation. At its opening 123 into combustion chamber 113 passage 121 has a generally triangular shape, best shown in FIG. 2, side walls 125, 127 extending generally radially from the axis of rotation thereof, but has an enlarged throat 129 at the apex thereof adjacent the axis of rotation. The walls of passage 121 are smoothly curved to provide an unrestricted passage from one end to the other thereof and the cross-sectional area of opening 123 is at least as great as the cross-sectional area of valve port 122. Because of the changing shape of the passage 121 throughout its length it is preferred to make the passage by casting using fine sand for the core.

As best illustrated in FIG. 2, valve housing 128 has, sequentially in sectors of the circle traversed by valve port 122 on rotation of valve 120 for communication with passage 121, an intake port 126, a fuel injector 130, ignition means, i.e., spark plug 132, and an exhaust port 134. A partition or shelf 116 extends inwardly from adapter cylindrical wall 119 adjacent the sector of the circle traversed by opening 123 when valve port 122 is in communication with fuel injector 130 to cover a major portion of the area of opening 123. Partition 116 commences before fuel injector 130, between the position thereof and intake port 126, so that it will cover opening 123 to form a separate chamber during fuel injection. Partition 116 has a limited circumferential extent greater than that of opening 123 terminating at the position of spark plug 132 so that as ignition progresses to its maximum rate, opening 123 is opened completely to combustion chamber 113. Partition 116 extends radially inward a limited extent relative to opening 123 to leave throat 129 open at all times, throat 129 comprising about 20 percent of the area of opening 123. The face 124 of piston 112 is contoured to match shelf 116 so that the space in combustion chamber 113 taken together with the volume of passage 121 will provide the desired compression ratio with the piston at top dead center (TDC).

The valve stem 144 is topped by a helical cut gear 156 which engages helical drive gear 158. Drive gear 158 is connected with the crankshaft via a mechanical linkage (not shown) designed to turn rotary valve 120 once for each two revolutions of the crankshaft.

A thrust bearing 166 is provided for valve 120 mounted on the end of gear 156 to cooperate with cap 167. Thrust bearing 166 is designed to operate both hydrostatically and hydrodynamically. Bearing 166 must take the thrust of the combustion chamber 113 pressure during the short period of maximum pressure when fuel is burning on the power stroke. The pressure over the area of the thrust bearing rises at this peak far beyond the pressure available from an ordinary oil pump. To balance this pressure, as shown in FIG. 1, the oil feed 170 to the bearing 166 is provided with a check valve 172 biased with a spring 174 set to open at a moderate oil feed pressure, e.g., 10 p.s.i., and to prevent any reverse flow of oil when the thrust bearing is under maximum pressure during combustion. To preclude any sludge or other matter which might cause check valve 172 to fail, the oil is passed through a filter 178 and preferably the engine is equipped with a separate oil supply tank and pump (not shown) for the thrust bearing oil system. In the event that check valve 172 should not operate properly, however, a restricted passage 180 is provided between the oil feed 170 and check valve 172. Thus, bearing 166 receives oil during alternate low pressure periods in the combustion chamber 113 and uses check valve 172 and backup restriction 180 to withstand high pressure during the power stroke. As a final backup to the hydrostatic system just described, bearing 166 has its surface facing cap 167 grooved with a plurality of spiral grooves 169, best illustrated in FIG. 3. The grooves 169 render bearing 166 hydrodynamic so that if all else fails, oil in the grooves will move over the surface of bearing 166 to lubricate it and cap 167. Grooves 169 are shallow, on the order of a few thousandths of an inch in depth and may be formed by spark erosion or high frequency abrasive techniques.

Valve 120 is cooled by water which enters from annular passage 191 in valve housing 128 encircling valve stem 144. Passage 191 communicates through perforations 142 in bearing 140 with a passage 192 in stem 144 which in turn communicates with the top of cooling tube 146. Water descends through tube 146 to plate 153, then flows outwardly below baffle 155 and returns annularly about tube 146 to passage 194 through perforations 143 in bearing 140 to annular return passage 196 encircling stem 144 in housing 128. Elastomeric O-rings 200, 201 and 202 ae used to seal the rotating interfaces between the passages 191, 192, 194 and 196, the O-rings being lubricated by the cooling water. An elastomeric O-ring 203 is also provided adjacent the bottom of bearing 140 between bearing 140 and valve 120 to insure against water leakage therepast and to retain lubricant which is furnished to bearing 140 by oil feed lines (not shown).

Port 122 in valve 120 is sealed by a circular sealing ring 148 in groove 150. Spherical upper wall 138 of valve 120 has a radius several thousandths of an inch smaller than the radius of wall 139 of housing 128. Ring 148 bridges the gap. As shown in FIG. 1, port 122, ring 148, and groove 150 lie at an angle to the axis of rotation of valve 120. A spring 184 in the base of groove 150 forces ring 148 outwardly to provide a spherical face engaging wall 139 of housing 128, spring 184 providing the sealing force at low speeds whereas centrifugal force provides adequate sealing force at high speeds. Since the outer portion of ring 148 moves faster than the inner portion thereof, ring 148 is caused to rotate in groove 150 distributing wear on the ring. Preferably, ring 148 is made of self lubricating material such as molybdenum disulphide. Another possibility is a carbon-graphite material. It would also be possible to employ a more exotic type material such as copper or steel impregnated with diamond dust which has been run against another diamond impregnated surface until the diamond edges have been rounded and no longer cut.

Ring 148 is subject to axial motion of high frequency during the ignition in combustion chamber 113. In addition there must be an allowance for thermal expansion of the parts in an axial direction. Some of this axial change is accommodated by thrust bearing 166. However, spring 184 must be long enough in an axial direction to carry considerable preload and is selected to accommodate axial motion on the order of about 0.005" without change of force greater than about 20 percent.

Sealing rings 186 in groove 190 and 210 in groove 212 work radially rather than axially and do not require spring backing. Lubrication is supplied above sealing ring 186 by an oil feed (not shown). Ring 210 on the other hand is lubricated by the oil in thrust bearing 166 and requires no special lubricating features.

Fuel injection through valve port 122 into passage 121 of valve 120 must occur within an extremely short period of time, e.g., as short as 0.0015 second, as valve port 122 rotates past fuel injector 130. Accordingly, a simple solenoid pump is provided for each cylinder of the engine.

Figures 4, 5:
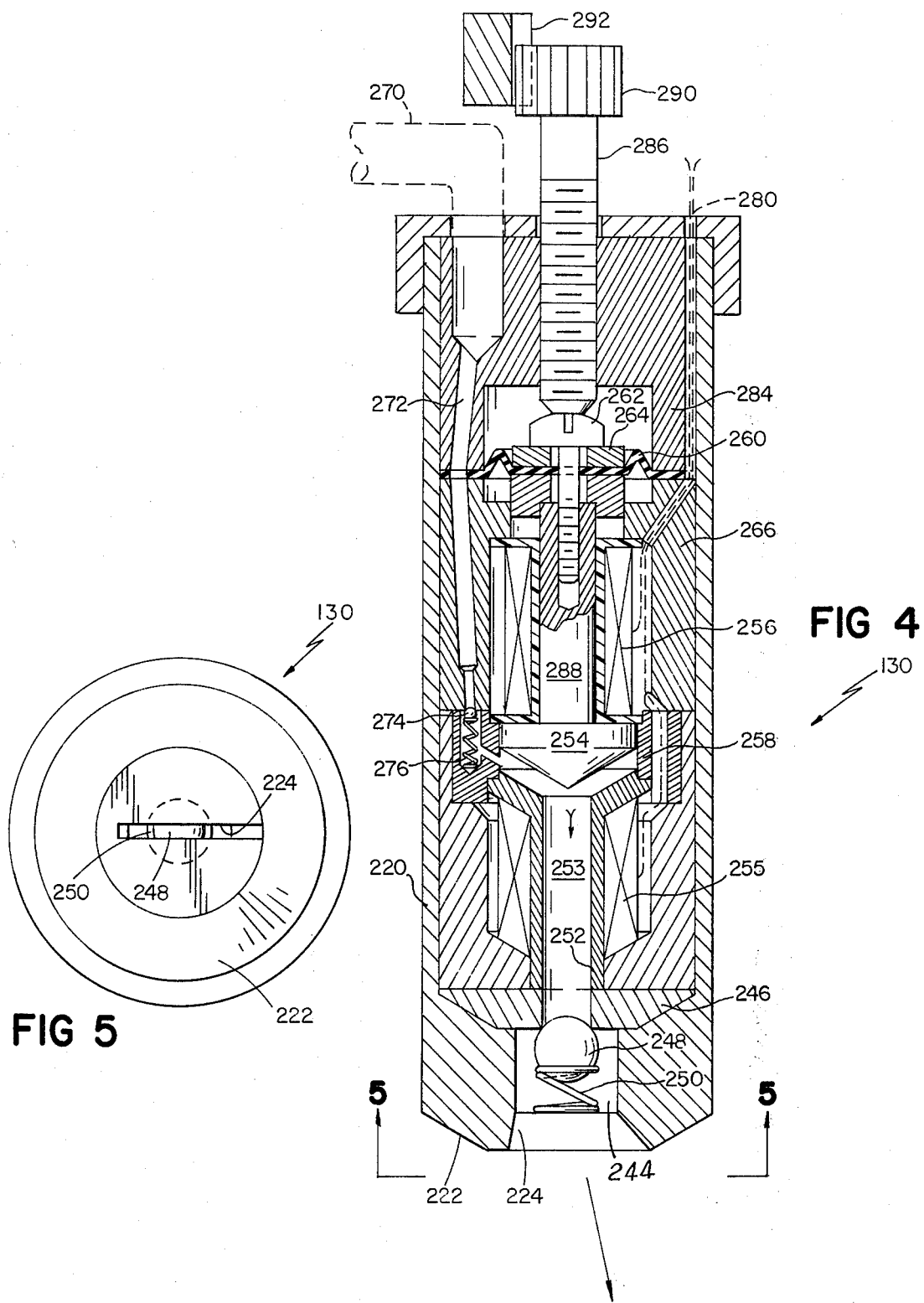
FIG. 4 is an enlarged schematic sectional view of the fuel injector employed in the cylinder.
FIG. 5 is a view taken along the line 5—5 of FIG. 4.

The fuel injector 130 is held in valve housing 128 by a lever 300, as shown in FIG. 1, rotatable for removal thereof. As best illustrated in detail in FIGS. 4 and 5, injector 130 comprises an injector body 220 having a tapered surface 222 designed to tightly fit into a matching cavity in housing 128. A narrow fuel exit slot 224 is provided in the injector 130 aligned with a narrow slot 131 in housing 128 for communication with valve port 122. Slots 131, 224 extend in a direction normal to the rotation of valve 120 (e.g., extending generally vertically in FIG. 1), thereby maximizing the time for injection of fuel through valve port 122 into passage 121. Slots 131, 224 are narrower than the width of sealing ring 148 to be covered by the ring as it passes slot 131.

Above the nozzle assembly of injector 130 in a cavity 244 is a ball 248 and spring 250 which cooperate with an aperture in a valve plate 246 to form a check valve holding back the fuel, at a moderate pressure, e.g., 10 p.s.i., until the injector is activated. Above the check valve is the solenoid pump assembly comprising a pole piece 252 having a central passage 253 therethrough leading to the check valve assembly and having a coil 255 thereabout. The solenoid pump valve assembly also includes an armature piston or plunger 254 spaced above pole piece 252 and fitted within cylindrical member 258. Another coil 256 is positioned about piston stem 288 arranged to charge piston 254 oppositely from pole piece 252 for quick action upon establishment of the magnetic circuits. Electrical supply wires 280 and coil leads are connected by solderless connectors (not shown).

Fuel line 270 connects via passage 272 with the space between piston 254 and pole piece 252. A check valve comprising ball 274 and spring 276 is provided in the passage 272. Fuel is pumped under low pressure from an ordinary fuel pump (not shown) through check valve 274 which raises piston 254 away from pole piece 252, ball 248 functioning to contain the fuel in passage 253.

Piston 254 is free to move but is sealed to block 266 and cup 284 by membrane 260 which is of fabric reinforced elastomer preferably of the type known as "Bellofram" a trademark of Bellofram Corporation of Burlington, Massachusetts. The membrane 260 is sealed to the top of piston 254 by screw 262 and washer 264.

To adjust the axial excursion of piston 254 and hence the amount of fuel injected upon actuation of the injector 130, a screw 286 is provided in the top of cup 284 bearing on screw 262. Screw 286 is topped by pinion gear 290 engaged by a rack 292 for turning screw 286 and thus throttling the engine. Thus, as the magnetic circuits are established by coils 255, 256, piston 254 is pulled to pole piece 252 forcing fuel ahead of it and out of slot 224, the amount of fuel injected being controlled by the setting of screw 286 as rack 292 and pinion 290 are selectively moved.

The spherical shapes of the walls 138 and 139 of valve 120 and housing 128 are not common in automotive manufacture but are easily and accurately formed by simple machinery. The initial shape for wall 139 is formed in the casting pattern for the valve housing 128. This has a smaller radius than the final dimension. After finishing the lower face of the casting and preferably a parallel upper surface as well, the valve housing 128 enters a multi-station machine. Vertical spindles on this machine carry: at a first station, a boring bar which finishes the inside of the cavity for journal bearing 140 on the proper center; at a second station an inclined shaft grinding spindle and motor, with a coarse roughing wheel which roughs out the partial spherical cavity to the same center as the cavity for bearing 140 machined by the spindle at the first station; and at third and fourth stations a finer grinding wheel and a finishing wheel which give the interior of the cavity a finish comparable to the cylinder walls of the engine. Tolerance of the spherical radius and depth can be about 0.025 inch. As the wheels wear, the spindles are advanced deeper into the casting, until the proper dimension is achieved.

The upper wall 138 of valve 120 has a radius several thousandths of an inch smaller than the cavity in the head, as previously noted, and does not require such a good surface finish; hence it is made by casting and machining. The bottom portion of the valve body and the upper surface of plate 153, both cast, are rough machined to give a good fit before joining the two parts together.

The operation of the illustrated four cycle engine can best be visualized by reference to FIG. 2. Valve 120 rotates within valve housing 128 as piston 112 reciprocates between top dead center and bottom dead center, TDC and BDC, respectively, as indicated in FIG. 2. Opening 123 is completely open during the exhaust and intake strokes and hence the cylinder is free breathing. As the valve 120 rotates, valve port 122 is in communication with intake port 126 admitting air to combustion chamber 113 during substantially the entire intake stroke of piston 112 as it moves from top dead center to bottom dead center. As piston 112 reaches bottom dead center on its intake stroke, intake port 126 is closed as valve port 122 moves therepast. During the compression stroke of piston 112, opening 123 of passage 121 is covered by partition 116 except at restricted throat 129 through which air is admitted in a turbulent flow during the compression stroke and valve port 122 is open to fuel injector 130 through slot 131. Fuel is then injected into passage 121 through slot 224 in injector 130 and through slot 131 and valve port 122, being confined in a rich mixture by partition 116 to passage 121 which forms with the partition a fuel injection-ignition chamber. The turbulent flow through throat 129 aids in the mixing of the fuel and its evaporation in the compressed air. The rich mixture in passage 121 has an air to fuel ratio of 8:1 to 14:1 as compared to an 18:1 to 30:1 ratio if the fuel were dispersed throughout the entire compression space above piston 112. Partition 116 terminates at spark plug 132 and as valve port 122 moves to spark plug 132, still during the compression stroke, opening 123 begins to be exposed to combustion chamber 113. Spark plug 132 ignites the rich mixture in passage 121 after valve port 122 passes and hence closes slot 131 and injector 130, while partition 116 only partially closes opening 123 still during the compression stroke, just before piston 112 reaches top dead center. Ignition progresses to its maximum rate at which point opening 123 has completely passed partition 116 and is wide open to combustion chamber 113. Thus the burning fuel spreads into the combustion chamber 113 for substantially complete combustion forcing piston 112 downward during its power stroke. As piston 112 passes bottom dead center valve port 122 communicates with exhaust port 134 and remains open thereto until piston 112 reaches top dead center. The cycle is then repeated.

Advantageously, hydrocarbons are substantially completely burned in the engine minimizing exhaust pollutants.

Figure 6:
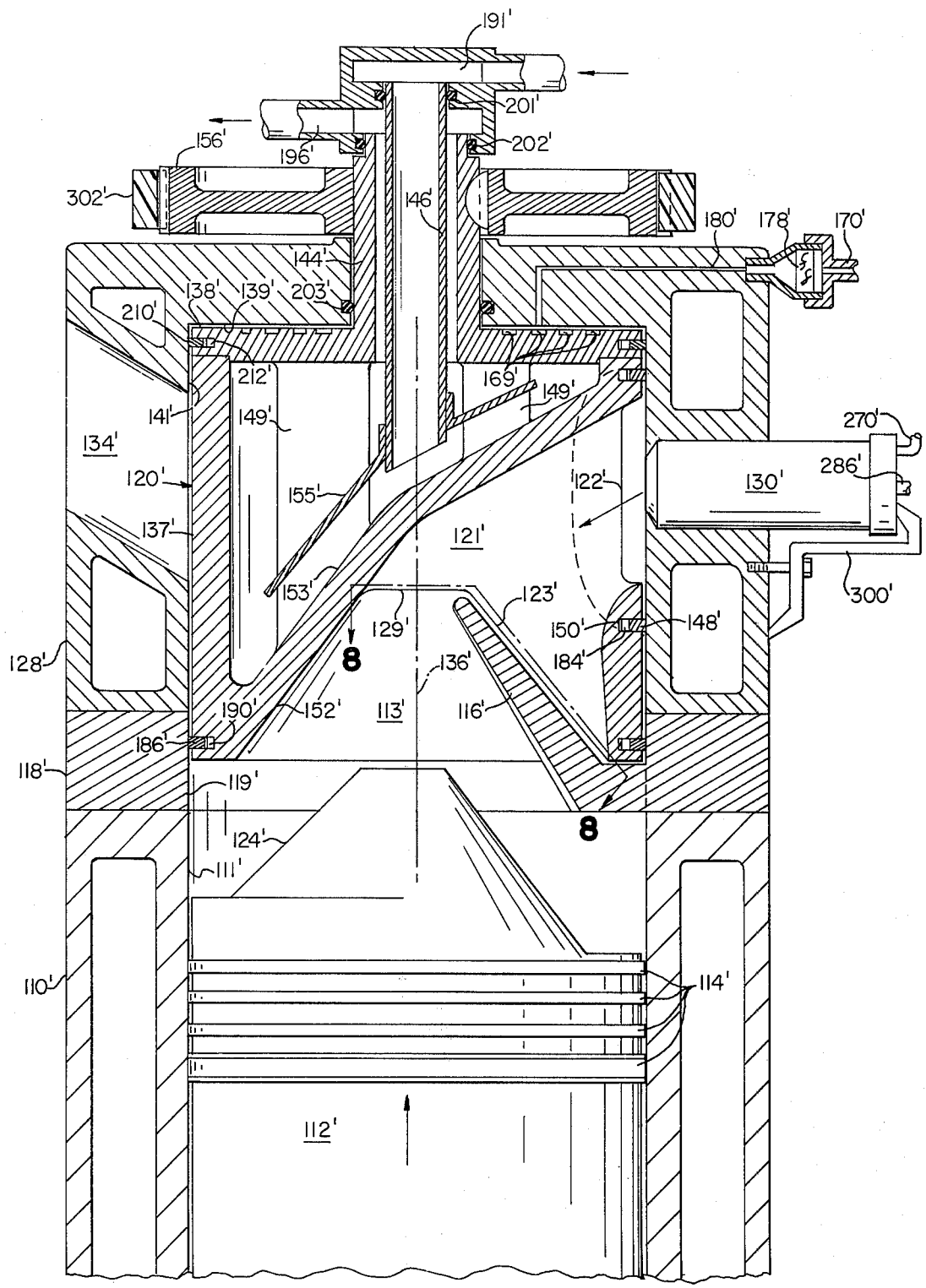
FIG. 6 is a schematic sectional view of one cylinder of an engine employing an alternate embodiment of the invention.

An alternate embodiment illustrated in FIG. 6 operates in the same manner as the embodiment just described. Although the alternate embodiment of FIG. 6 is similar to that of FIG. 1, it embodies a number of features to simplify its construction and to improve its operation. For convenience the same reference numerals with a prime indication, e.g., 120'; are used for corresponding parts of the two embodiments.

As shown in FIG. 6, the alternate embodiment includes a head comprising simply a valve housing 128'. Valve housing 128' has a cylindrical interior wall 141' housing a cylindrical rotary valve 120' having facing cylindrical wall 137'. Facing horizontal surfaces 138', 139' of valve 120' and housing 128' are flat rather than spherical and surface 138' comprises a hydrodynamic thrust bearing for the valve, being spirally grooved, 169', and having a lubrication system feeding through filter 178'. The lubrication system in this embodiment omits the check valve and restricted passage employed in the embodiment of FIG. 1.

The lower surface 152' of valve 120' is of generally conically recessed configuration except at central portion coaxial of valve 120', which comprises the throat 129' of opening 123'. Opening 123' has the configuration shown in FIG. 8, a developed view thereof taken along the line 8—8 of FIG. 6. Partition 116' conforms to the conical configuration of surface 152'. Thus when valve port 122' is adjacent fuel injector 130' partition 116' closes opening 123' except at throat 129' which is ideally located coaxially of and facing piston 112'. The face 124' of piston 112' is contoured to match the conical configuration of valve surface 152' and partition 116'.

Valve port 122' is altered as best shown in FIG. 7 to have a generally rectangular configuration for clean, rapid opening and closing of intake and exhaust ports 126' and 134' which also have rectangular openings. Seal 148' in groove 150' is circular, is made of molybdenum disulphide and is backed by a Belleville washer of spring 184' which serves to seal the bottom of groove 150' as well as to bias seal 148'.

Valve stem 144' extends through housing 128' and thereabove has belt drive gear 156' mounted thereon. As best shown in FIG. 9 a timing belt 302', extends about gears 156' of a plurality of rotary valves in an engine, and about a drive gear 157' connected (not shown) to the engine crankshaft. Between gears 156' and gear 157', rollers 159' pinch belt 302' in to assure adequate wrap around the gears.

Cooling tube 146' passes centrally up stem 144' spaced from the interior walls thereof and held in position by ribs (not shown) extending from the interior walls of stem 144'. Above gear 156', tube 146' communicates with the water inlet passage 191' of a cooling manifold. Immediately therebelow the passage defined between the interior wall of stem 144' and tube 146' communicates with the water outlet passage 196' of the cooling manifold.

Because of its cylindrical design, the head of the embodiment illustrated in FIG. 6 may be easier to build by conventional engine building techniques than the design illustrated in FIG. 1 and may for that reason be preferred.

Other embodiments of this invention will occur to those skilled in the art which are within the scope of the following claims.

What is claimed is:

1. In an internal combustion engine having:
   a combustion chamber;
   a member having an elongated passage therein one end of said passage communicating with said combustion chamber and comprising an unrestricted opening into said combustion chamber; and
   a fuel injector arranged to inject fuel into the other end of said passage;
   that improvement in which:
   a partition partially blocks said opening and defines with said passage a fuel injection chamber with a restricted open throat communicating with said combustion chamber during injection of fuel into said passage;
   said member and said partition being mounted to said engine for rotation relative to each other and said partition having a limited circumferential extent; whereby said partition is removed by said relative rotation to unblock said opening after injection of fuel into said passage.

2. The improvement claimed in claim 1 in which said partition blocks a major portion of the area of said opening.

3. The improvement claimed in claim 1 in which said opening at said one end of said passage is at least as large in area as the other end thereof and said passage has walls formed to provide an unrestricted passage from one end to the other end thereof.

4. In an internal combustion engine having:
   a combustion chamber;
   a stationary valve housing;

a rotary valve member in said valve housing having a valve port on one side thereof adjacent said valve housing, an opening on another side thereof communicating directly with said combustion chamber and an elongated passage between said valve port and said opening, said opening being unrestricted, and said valve port, said opening and said passage adapted to move in a circle on rotation of said valve member; and a fuel injector in said valve housing in a sector of the circle traversed by said valve port for communication therewith and for injection of fuel through said valve port into said passage;

that improvement in which:

a partition is positioned in the sector of the circle traversed by said opening when said valve port is in communication with said fuel injector;

said partition is dimensionally smaller in one portion than said opening, whereby said partition defines with said passage a fuel injection chamber with a restricted open throat communicating with said combustion chamber during injection of fuel through said valve port into said passage; and said partition has a limited circumferential dimension greater than that of said opening;

whereby said partition and said throat restriction are removed from said opening as said valve port rotates away from said fuel injector.

5. The improvement claimed in claim 4 in which said partition has an area extending over a major portion of the area of said opening when said valve port is adjacent said fuel injector.

6. The improvement claimed in claim 4 in which said opening is at least as large in area as said valve port and said passage has walls providing an unrestricted passage from said valve port to said opening.

7. The improvement claimed in claim 4 in which said valve housing comprises, in sectors of the circle traversed by said valve port and sequentially in the direction of rotation of said valve member, an intake passage, said fuel injector, ignition means and an exhaust passage, said partition extending circumferentially in the sector of the circle traversed by said opening when said valve port is between said intake passage and said ignition means.

8. The improvement claimed in claim 7 in which said partition circumferentially commences in the sector of the circle traversed by said opening when said valve port is past said intake passage and terminates in the sector of the circle traversed by said opening when said valve port is adjacent said ignition means.

9. The improvement claimed in claim 4 in which the radial extent of said opening is greater than that of said partition.

10. The improvement claimed in claim 4 in which said partition is connected to a wall of said combustion chamber and extends radially inward therefrom a distance less than the radially inward extent of said opening.

11. The improvement claimed in claim 10 in which said partition has an area extending over a major portion of the area of said opening when said valve port is adjacent said fuel injector.

12. The improvement claimed in claim 11 in which said valve housing comprises, in sectors of the circle traversed by said valve port and sequentially in the direction of rotation of said valve member, an intake passage, said fuel injector, ignition means and an exhaust passage, said partition extending circumferentially in the sector between said intake passage and said ignition means.

13. The improvement claimed in claim 12 in which said partition circumferentially commences after said intake passage and terminates adjacent said ignition means.

14. The improvement claimed in claim 13 in which said opening is at least as large in area as said valve port and said passage has walls providing an unrestricted passage from said valve port to said opening.

* * * * *